United States Patent Office 3,429,847
Patented Feb. 25, 1969

3,429,847
ORGANOSILICON COMPOUNDS AND COMPOSITIONS CONTAINING THE SAME
Jean Boissieras and Louis Frederic Ceyzeriat, Lyon, France, assignors to Rhone Poulenc S.A., Paris, France, a French body corporate
No Drawing. Filed Oct. 23, 1965, Ser. No. 504,209
Claims priority, application France, Nov. 10, 1964, 994,478
U.S. Cl. 260—37    15 Claims
Int. Cl. C08g 47/02, 51/74; C07c 7/10

ABSTRACT OF THE DISCLOSURE

The invention provides new α,ω-bis(diaminoxysilyl) alkanes of the formula:

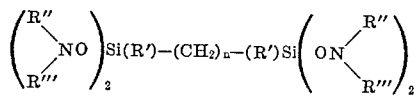

weher $n$ is an integer and R′, R″ and R‴ are organic radicals, R″ and R‴ being optionally joined. When mixed with α,ω-dihydroxyorganopolysiloxane oils, these new compounds give compositions which can be cured to elastic solids, especially useful for joining concrete slabs, by exposure to ambient moisture.

---

The present invention relates to organosilicon compounds and compositions containing the same which can be converted at ambient temperature into elastic solids on contact with water in vapour or liquid form.

The present invention provides new compounds which may be employed in compositions which can be converted into elastic solids useful for the formation of various joints and coatings, for adhesive bonding, more especially when these joints, coating and bonding agents are used in conjunction with masonry. The new compositions are stable on storage in the absence of moisture and can be converted into elastic solids by the action of water.

Various methods of sealing joints, for example between slabs, pipes or other building elements of concrete, have already been proposed. Thus, it has been proposed for this purpose to apply to the said material compositions comprising bifunctional linear organopolysiloxanes, polyfunctional organic compounds of silicon, such as tetra-alkoxysilanes, and condensation accelerators, such as dialkyltin carboxylic salts. However, the products hitherto employed do not give good bonds with concrete if this material is not previously coated with an adhesion underlayer.

There is therefore a need for compositions which can be used directly to form fluid-tight joints between masonry elements which adhere strongly to the masonry and resist ageing caused by weathering.

It has now been found that this object may be achieved by utilising for the said purpose organosilicon compositions comprising an α,ω-dihydroxy diorganopolysiloxane oil and an α,ω-bis(diaminoxysilyl)alkane as hereinafter defined. The new compositions may also contain inert fillers, pigments and diluents. Such compositions may be prepared without special precautions at the time of use, or they may be prepared in advance, with certain precautions hereinafter indicated, and then kept without deterioration until the time of use.

The diorganopolysiloxane oil may be a compound of the formula:

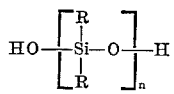  (I)

in which $n$ represents an integer which is generally between 100 and 10,000, and the R symbols which are the same or different, represent monovalent hydrocarbon radicals which are either unsubstituted or optionally substituted by one or more functional atoms or groups which do not interfere with the conversion of the composition into an adherent elastic joint at the time of their use, and, in the case of compositions required to be stable during storage, do not give rise to reactions which are incompatible with the desired stability.

R may be alkyl of 1 to 4 carbon atoms, alkenyl having only one double bond and of 1 to 4 carbon atoms, more particularly vinyl or allyl, a cycloaliphatic radical having 5 or 6 nuclear carbon atoms such as cyclopentyl, cyclohexyl or cyclohexenyl, an aryl or aralkyl radical e.g. phenyl, optionally substituted by lower alkyl, e.g. tolyl, xylyl or cumenyl, or a phenylalkyl radical such as benzyl or phenylethyl. R may also represent certain halogenated radicals corresponding to the foregoing hydrocarbon radicals, more particularly chlorocyclohexyl, chlorophenyl or chlorobenzyl. Ordinarily R is alkyl of 1 to 4 carbon atoms or phenyl.

The limiting values given for $n$ are not absolutely essential and in some cases, α,ω-dihydroxy diorganopolysiloxane oils may be employed, in which the value of $n$ differs somewhat from the aforesaid limits.

The compounds of Formula I may be homopolymers or copolymers. Moreover, the new compositions are not limited to the use of a single homopolymer or copolymer, but may comprise mixtures of homopolymers and/or of copolymers of different nature and different molecular weights. Even in the case where the compound of Formula I consists of a single homopolymer, it is substantially always a mixture of molecules having different values of $n$.

The α,ω-bis(diaminoxysilyl)alkanes are new compounds (and, as such, within the scope of this invention) having the formula:

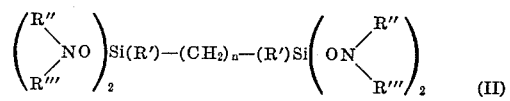 (II)

in which $n$ is an integer preferably from 4 to 12, and R′, R″ and R‴ represent the same or different organic radicals, R″ and R‴ being optionally linked together. Such radicals may be monovalent hydrocarbon radicals either unsubstituted or substituted by one or more functional atoms or groups, provided that these substituents do no interfere with the subsequent conversion of the composition into a joint which adheres to masonry, and, in the case of compositions required to be stable in storage, do not produce secondary reactions which are incompatible with the desired stability. The 6 radicals represented by the symbols R, R″ and R‴ may be all identical or all different, or some of them may be identical and the others different. Moreover, the radicals R″ and R‴ carried by one and the same nitrogen atom may form together with this nitrogen atom a monovalent heterocyclic radical.

More precisely, R′, R″ and R‴ may be chosen from the same group of radicals as R. When R″ and R‴ form a heterocycle with the nitrogen atom, this heterocycle may be a mononuclear heterocycle having 5 or 6 atoms in the ring, and may contain a second heteroatom. Moreover, this heterocycle may optionally carry alkylated substituents such as methyl, ethyl or propyl. The residue

may thus be, for example, a pyrrolidinyl, piperidino, monomethylpiperidino, dimethylpiperidino, monoethylpiperidino, diethylpiperidino, 4-methyl-1-piperazinyl, or 4-ethyl-1-piperazinyl residue.

Especially valuable compounds of Formula II are those in which R' is alkyl of 1 to 6 carbon atoms, and R" and R''' are either alkyl of 1 to 6 carbon atoms or together with the adjacent nitrogen represent a saturated mononuclear 5 or 6 membered heterocyclic ring.

Although it is sufficient to use a single compound of Formula II in a given composition, it is, of course, possible to use more than one such compound.

The quantity of $\alpha,\omega$-bis(diaminoxysilyl)alkane employed in the new compositions may vary within fairly wide limits, both in extemporaneously prepared compositions and compositions stable in storage. It is similar to the proportion of crosslinking agent employed in similar vulcanising systems. Thus, a proportion of 2% to 12% based on the weight of $\alpha,\omega$-dihydroxy diorganopolysiloxane is generally quite suitable.

As has been stated, the extemporaneously prepared compositions and the stable in storage compositions may contain fillers. In either case, it is desirable to employ only fillers which are inert to both types of compounds. When it is desired to prepare compositions stable in storage, it is advisable in addition to exclude any filler which might be capable of catalysing the reaction together of the two types of compound in the absence of moisture.

As fillers which may be employed in either type of composition, there may be mentioned more particularly reinforcing fillers such as silicas of combustion and silica aerogels having a large surface area, which may themselves optionally be treated with an organosilicon derivative. Apart from these reinforcing fillers, there may also also be employed ground crude silicas, ground quartz, alumina, titanium dioxide, calcium carbonate, graphite, carbon black, polyvinyl chloride or cork powder. If desired, the new compositions may also contain organopolysiloxanes which are free from reactive groupings, or pigments or other substances which are suitable for the use for which the composition is intended. The composition may generally be prepared without the use of diluents, but if the final composition is to be applied in liquid form it may be advantageous to employ fluidising agents, provided that they are not likely to interfere with its conversion into an elastomer and, when a stable storage composition is to be produced, are completely inert to the constituents of the composition. As fluidising agents, there may be employed, for example halogenated or non-halogenated benzene hydrocarbons such as benzene, toluene, or chlorobenzene, white spirit, halogenated or non-halogenated aliphatic hydrocarbons, such as hexane, heptane, trichloroethylene or tetrachloroethylene, or alicyclic hydrocarbons such as cyclohexane or methylcyclohexane.

When the compositions are to be employed immediately after, or shortly after, their preparation, they may be prepared by simply mixing the constituents without any particular precautions, although it is generally preferred to add the compound of Formula II last. For preparing compositions stable in storage, use must be made of water-free compounds and the operation must be carried out under conditions such as to avoid any introduction of moisture. If the composition contains a filler and/or pigments, an intimate mixture of organopolysiloxane of Formula I with the filler and/or pigments is first prepared, any moisture introduced by these products being carefully eliminated, for example by heating the mixture under a current of dry nitrogen, and, after cooling, the compound of Formula II is incorporated and the composition obtained is packed in fluid-tight receptacles.

The compositions of the invention are gradually converted into elastic solids on contact with water, which may be supplied simply by the moisture of the air. The setting period may vary within very wide limits, depending upon the manner in which the water is introduced and upon the temperature. In the cold, and merely by the action of the moisture of the ambient air, the conversion into an elastic solid may take several days to complete, it obviously being longer as the layer of the composition is thicker.

The new compositions, whether prepared extemporaneously or for good storage stability, may be used in all caulking and bonding applications in the masonry field. They constitute an excellent lining material for thrust and sealing joints between the parts of a building, such as slabs or piping. They may be employed as adhesives for the adhesive attachment of facings. The advantage of these compositions, as compared with the organosilicon elastomers hitherto employed for these applications, resides above all in the fact that the elastomers resulting therefrom adhere directly to the parts of the construction without the use of a primary adhesion layer being necessary, and in the fact the bonding effected is remarkably resistant to the action of atmospheric agents. The masonry constructions with which the invention is concerned may be, for example, constructions pertaining to building roads, runways, civil engineering works, bridges, swimming pools and harbour installations.

Although the new compositions may be more particularly intended for applications in masonry in which they have remarkable properties, their use in other fields is also envisaged.

The $\alpha,\omega$-bis(diaminoxysilyl)alkanes of Formula II may be prepared by reacting under anhydrous conditions an $\alpha,\omega$-bis(organodihalogenosilyl)alkane of the formula:

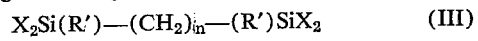
$$X_2Si(R')—(CH_2)_n—(R')SiX_2 \qquad (III)$$

in which X represents a halogen atom and R' is as hereinbefore defined, with a substituted hydroxylamine of the formula:

where R" and R''' are as previously defined, the reaction being carried out in the presence of an acceptor for the hydracid liberated by the reaction, and generally in an organic diluent which is inert under the operating conditions. The reaction may be diagrammatically represented by the equation:

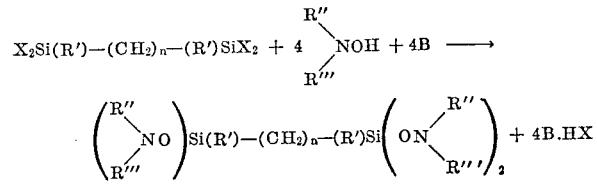

in which B represents the hydracid acceptor employed.

As hydracid acceptor, mineral or organic compounds may be used which are capable of reacting with the liberated hydracid, but which are inert to the starting materials and other products of the reaction. Tertiary amines such as triethylamine or tripropylamine, dialkylanilines, and heterocyclic tertiary amines such as pyridine and its various alkyl derivatives such as lutidines and picolines, are quite suitable.

The presence of an inert organic diluent is desirable and facilitates the dispersion of the solid phase in the reaction medium. For example, saturated aliphatic ethers, aliphatic hydrocarbons such as hexane or heptane, halogenated or non-halogenated aromatic hydrocarbons such as benzene, toluene or chlorobenzene, or alicyclic hydrocarbons, such as cyclohexane or methylcyclohexane, may be employed.

A practical mode of carrying out the process consists in gradually introducing the compound of Formula III into a mixture maintained at the appropriate temperature and consisting of the diluent, the tertiary amine and the disubstituted hydroxyamine.

The reaction temperature is not critical and may vary within fairly wide limits. For example, the operation may be carried out between −50° and +80° C. and preferably between −20° and +25° C., but these limits are in no way absolute, and may be departed from to some extent.

When the reaction has ended, the reaction mixture is filtered to separate the salt formed by neutralisation of the liberated hydracid, and the solvent is then optionally eliminated.

The following examples illustrate the invention.

EXAMPLE 1

The apparatus used consists of a three-litre four-necked round-bottomed flask provided with a mechanical stirrer, a dropping funnel, a reflux condenser and a thermometer tube. It is completed by a system for purging with dry nitrogen and is protected from moisture by means of a drying column packed with calcium chloride. It may be externally cooled.

2000 cc. of anhydrous diethyl ether, 195 g. (2.2 mol.) of diethylhydroxylamine, and 222 g. (2.2 mol.) of triethylamine are introduced into the flask. The apparatus is purged by a current of nitrogen and cooled to −10° C. A solution of 142 g. (0.5 mol.) of 1,4-bis(methyldichlorosilyl)butane in 200 cc. of diethyl ether is then added in 30 minutes, the temperature of the reaction mixture being maintained in the neighbourhood of −10° C. The mixture is then allowed to heat up to ambient temperature and is kept at this temperature for several hours with stirring. The triethylamine hydrochloride is then separated by filtration and washed with 500 cc. of anhydrous benzene. The organic solutions are then combined and the solvents are eliminated by distillation, first at atmospheric pressure and then by heating at 100° C. under 2 mm. Hg. for one hour. An oily product remains, purification of which is completed by treatment with activated charcoal, followed by filtration through kieselguhr. 222 g. of 1,4-bis[methyl - bis(diethylaminoxy) - silyl]butane are obtained having $n_D^{20}=1.4540$ in a yield of 89%. It distills at 164° C. under 0.2 mm. Hg.

EXAMPLE 2

Into an apparatus provided with a heating device and a stirrer are introduced: 180 g. of α,ω-dihydroxylated dimethylpolysiloxane oil having a viscosity of 106,000 centistokes at 25° C., the hydroxyl grouping content of which is 0.08% by weight; 17 g. of a dimethylpolysiloxane oil having a viscosity of 25 centistokes at 25° C., formed of linear molecules whose ends are blocked by trimethylsiloxy groupings; 5 g. of silica of combustion ("Aerosil" brand); 19 g. of "Celite Superfloss" silica. These materials are intimately mixed at ambient temperature and then gradually heated to 150° C. under a current of nitrogen to entrain the volatile products. The heating and the nitrogen current are maintained for 2 hours and, after cooling, 122 g. of the mixture thus obtained are withdrawn and 6.7 g. of 1,4-bis[methyl-bis(diethylaminoxy)silyl]butane are added thereto. After intimate mixing, the composition thus obtained is packed in absolutely fluid-tight receptacles.

A portion of this composition is spread in a layer 1.1 mm. thick on a glass plate previously coated with an aqueous solution of the sodium salt of a sulphated secondary alcohol marketed under the trademark "Teepol." Setting takes place slowly and is complete at the end of four days, at which time the film may be detached from its support. When left in the air, the elastomer sheet thus obtained continues to change for several more days and has, after one week and after 40 days, the following mechanical characteristics:

|  | After 1 week | After 40 days |
|---|---|---|
| Shore hardness A | 7–8 | 17.1 |
| Tensile strength, kg./cm.² | 4.6 | 11 |
| Elongation at rupture, percent | 1,247 | 659 |

After three months, the elasticity is completely preserved and the elongation at rupture is 693%.

The composition kept in fluid-tight receptacles has not undergone any modification after preservation for two months at ambient temperature (20° C.). When applied in films, it gives the same results as those already given.

With one part of freshly prepared composition, a layer 6 mm. thick is formed between concrete test pieces of parallelepipedic shape having the following dimensions: 95 mm. x 25 mm. x 25 mm. The only treatment which the test pieces undergo is a simple brushing. The assembly thus constituted is left to the action of the moist ambient air (variable relative humidity from 52% to 65%). At the end of one month, a traction test is performed by engaging each line of the test pieces in one of the jaws of a traction machine. The elastomer ruptures without detachment from the concrete at a tractive force of 4.15 kg./cm.²; the elongation at rupture is 360%. The concrete test pieces bearing parts of the broken elastomer are immersed in salt water. After immersion for two months, the elastomer shows no tendency to become detached from the concrete to which it adheres. If this test is repeated with a composition which has been left for one month at 20° C., the same results are obtained.

To 100 g. of the above-described composition are added 5.45 g. of an ethyl polysilicate titrating 40% of $SiO_2$ and 1 g. of dibutyltin dilaurate as vulcanisation catalyst. One portion of the composition obtained is spread between concrete test pieces similar to those described above. The composition is completely vulcanised to an elastomer at the end of two days. After one week, when an attempt is made to apply the traction tests to this bond, it is found that the elastomer detaches too rapidly to undergo physical measurements.

EXAMPLE 3

Into a two-litre round-bottomed flask equipped in the same way as that used in Example 1 are introduced 1000 cc. of anhydrous diethyl ether, 88.8 g. of triethylamine and 78.4 g. of diethylhydroxylamine. When the apparatus has been cooled and its atmosphere purged with nitrogen, a solution of 68 g. of 1,8-bis(methyldichlorosilyl)octane in 100 cc. of diethyl ether is added in one hour with stirring, the temperature being maintained at −10° C. The operation is then continued as in Example 1 and 87.5 g. of an oil having $n_D^{20}=1.4570$ are finally obtained, identified as 1,8-bis[methyl-bis(diethylaminoxy)silyl]octane.

EXAMPLE 4

To 100 g. of the mixture prepared as in Example 2 5.45 g. of 1,8-bis[methyl-bis(diethylaminoxy)silyl]octane are added, and the constituents are intimately mixed. With this composition, a space 5 mm. wide between two concrete slabs is sealed. After two months, it is found that the elastomer still adheres tenaciously to the walls of the concrete slabs.

EXAMPLE 5

The procedure of Example 3 is followed, but the 68 g. of 1,8-bis(methyldichlorosilyl)octane are replaced by 79.2 g. of 1,12-bis(methyldichlorosilyl)dodecane in 100 cc. of diethyl ether. 88.5 g. of 1,12-bis[methyl-bis(diethylaminoxy)silyl]dodecane are finally obtained as a light yellow oil having $n_D^{20}=1.460$ and $d_4^{20}=0.9332$.

EXAMPLE 6

100 g. of the initial mixture prepared as in Example 2 are intimately mixed with 6.1 g. of 1,12-bis[methyl-bis(diethylaminoxy)silyl]dodecane. The composition obtained is spread on a concrete plate in a coating 1.5 mm. thick, and it becomes hardened in the mass after 6 hours. The bond thus obtained between the concrete and the elastomer remains strong after immersion in water for a month.

We claim:
1. An α,ω-bis(diaminoxysilyl)alkane of the formula:

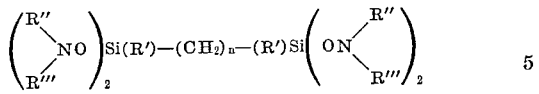

where $n$ is an integer and R', R", and R'" represent the the same or different organic radicals selected from the group consisting of alkyl, alkenyl, a cycloaliphatic ring of 5 to 6 carbon atoms, aryl, aralkyl, and halogenated derivatives of the above and wherein R" and R'" together with the adjacent nitrogen may be a 5 or 6 membered heterocyclic ring selected from the group consisting of pyrrolidinyl, piperidino, piperazinyl and alkylated derivatives thereof.

2. An α,ω-bis(diaminoxysilyl)alkane of the formula:

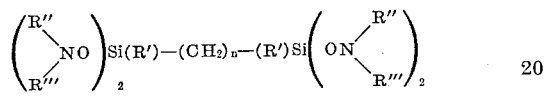

in which $n$ is from 4 to 12, R' is alkyl of 1 to 6 carbon atoms, and R" and R'" are either alkyl of 1 to 6 carbon atoms or R" and R'" together with the adjacent nitrogen may be a 5 or 6 membered heterocyclic ring selected from the group consisting of pyrrolidinyl, piperidino, piperazinyl and alkylated derivatives thereof.

3. 1,4-bis[methyl-bis(diethylaminoxy)silyl]butane.
4. 1,8-bis[methyl-bis(diethylaminoxy)silyl]octane.
5. 1,12-bis[methyl-bis(diethylaminoxy)silyl]dodecane.

6. An organosilicon composition comprising an α,ω-dihydroxy diorganopolysiloxane oil and an α,ω-bis(diaminoxysilyl)alkane of the formula:

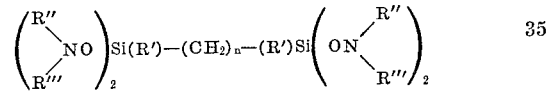

where $n$ is an integer and R', R" and R'" represent the same or different organic radicals selected from the group consisting of alkyl, alkenyl, a cycloaliphatic ring of 5 to 6 carbon atoms, aryl, aralkyl, and halogenated derivatives of the above and wherein R" and R'" together with the adjacent nitrogen may be a 5 or 6 membered heterocyclic ring selected from the group consisting of pyrrolidinyl, piperidino, piperazinyl and alkylated derivatives thereof.

7. An organosilicon composition according to claim 6 in which the α,ω-dihydroxy diorganopolysiloxane oil has the formula:

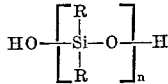

where $n$ is 100 to 10,000 and R is alkyl of 1 to 4 carbon atoms or phenyl.

8. Organosilicon compositions according to claim 6 in which the proportion of α,ω-bis(diaminoxysilyl)alkane is 2 to 12% by weight of the α,ω-dihydroxy diorganopolysiloxane.

9. An organosilicon composition according to claim 6 containing a silica filler.

10. An organosilicon composition comprising an α,ω-bis(diaminoxysilyl)alkane of the formula:

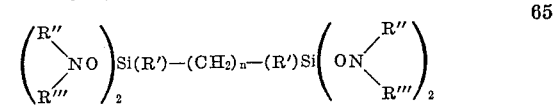

in which $n$ is 4 to 12, R' is alkyl of 1 to 6 carbon atoms, and R" and R'" taken separately are each alkyl of 1 to 6 carbon atoms, and taken together with the adjacent nitrogen represent a saturated, monocyclic, 5 or 6 membered, heterocyclic nucleus, selected from the group consisting of pyrrolidinyl, piperidino, piperazinyl, and alkylated derivatives thereof, and an α,ω-dihydroxy diorganopolysiloxane oil of the formula:

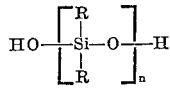

wherein $n$ is 100 to 10,000 and R is alkyl of 1 to 4 carbon atoms or phenyl, the proportion of α,ω-bis(diaminoxysilyl)alkane being 2 to 12% of the weight of the α,ω-dihydroxy diorganopolysiloxane.

11. An organosilicon composition according to claim 10 containing a silica filler.

12. A cured elastomeric polysiloxane composition produced by the action of water on an organosilicon composition comprising an α,ω-dihydroxy diorganopolysiloxane oil and an α,ω-bis(diaminoxysilyl)alkane of the formula:

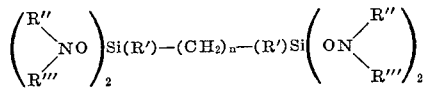

where $n$ is an integer and R', R", and R'" represent the same or different organic radicals, selected from the group consisting of alkyl, alkenyl, a cycloaliphatic ring of 5 or 6 carbon atoms, aryl, aralkyl, and halogenated derivatives of the above and wherein R" and R'" together with the adjacent nitrogen may be a 5 or 6 membered heterocyclic ring selected from the group consisting of pyrrolidinyl, piperidino, piperazinyl and alkylated derivatives thereof.

13. A cured elastomeric polysiloxane composition produced by the action of water on an organosilicon composition comprising an α,ω-bis(diaminoxysilyl)alkane of the formula:

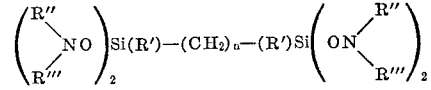

in which $n$ is 4 to 12, R' is alkyl of 1 to 6 carbon atoms, and R" and R'" taken separately are each alkyl of 1 to 6 carbon atoms, and taken together with the adjacent nitrogen represent a saturated, monocyclic, 5 or 6 membered, heterocyclic nucleus selected from the group consisting of pyrrolidinyl, piperidino, piperazinyl and alkylated derivatives thereof, and an α,ω-dihydroxy diorganopolysiloxane oil of formula:

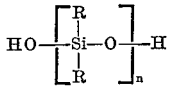

where $n$ is 100 to 10,000 and R is alkyl of 1 to 4 carbon atoms or phenyl, the proportion of α,ω-bis(diaminoxysilyl) alkane being 2 to 12% of the weight of the α,ω-dihydroxy diorganopolysiloxane.

14. A composition according to claim 12 in the form of a coating on masonry or a joint between masonry units.

15. A composition according to claim 13 in the form of a coating on masonry or a joint between masonry units.

References Cited

UNITED STATES PATENTS

| | | | |
|---|---|---|---|
| 3,109,013 | 10/1963 | Haluska | 260—448.2 |
| 3,318,898 | 5/1967 | Boissierac et al. | 260—46.5 |
| 3,341,486 | 9/1967 | Murphy | 260—46.5 |

MORRIS LIEBMAN, *Primary Examiner.*

JOHN E. CALLAGHAN, *Assistant Examiner.*

U.S. Cl. X.R.

260—46.5, 448.2